Sept. 11, 1962 E. GRÜNKE 3,053,206

SEWING MACHINES HAVING ORNAMENTAL STITCH DEVICES

Filed Jan. 7, 1960 2 Sheets-Sheet 1

INVENTOR
Erich GRÜNKE

BY Robert H. Jacob

AGT.

SEWING MACHINES HAVING ORNAMENTAL STITCH DEVICES
Filed Jan. 7, 1960 2 Sheets-Sheet 2
Fig. 3
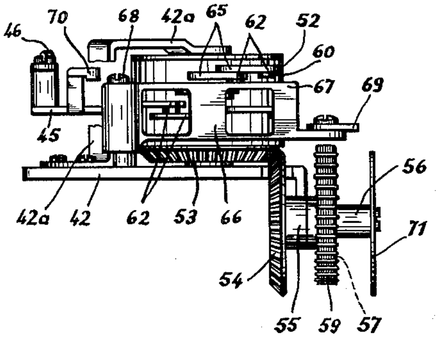
Fig. 5
| A | B | C | D |
|---|---|---|---|
| 1 | — | — | — |
| 2 | ½B | 1 | — |
| 3 | L ½B | 5 | — |
| 4 | L | 7 | I |
| 5 | B | 4 | — |
| 6 | L B | 3 | — |
| 7 | — | — | — |
| 8 | ½B | 6 | — |
| 9 | L ½B | 8 | II |
| 10 | L | 4 | I |
| 11 | B | 2 | — |
| 12 | L B | 7 | — |
| 13 | — | — | — |
| 14 | ½B | 5 | — |
| 15 | L ½B | 1 | II |
| 16 | L | 8 | I |
| 17 | B | 3 | — |
| 18 | L B | 6 | — |
Fig. 2
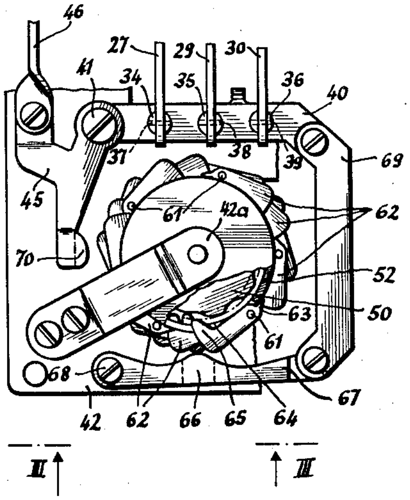
Fig 6
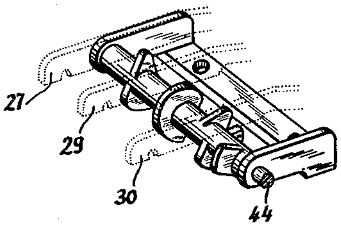
Fig 4
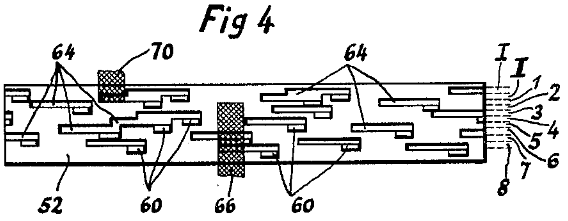
INVENTOR.
ERICH GRÜNKE
BY Robert H. Jacob
AGT.

3,053,206
Patented Sept. 11, 1962

3,053,206

SEWING MACHINES HAVING ORNAMENTAL STITCH DEVICES

Erich Grünke, Hinwil-Zurich, Switzerland, assignor to Emil Forster and Jakob Forster, Hinwil-Zurich, Switzerland, trading in partnership as Gebruder Forster
Filed Jan. 7, 1960, Ser. No. 2,096
Claims priority, application Germany, Jan. 9, 1959
5 Claims. (Cl. 112—158)

The invention relates to sewing machines having devices for sewing ornamental stitches of the type which includes at least one setting means for adjusting the stitch formation and a plurality of pattern cam discs carried by a common driving shaft for guiding or controlling the setting means.

The overall arrangement of conventional ornamental stitch devices of this kind cannot be clearly surveyed. Such devices are complicated to operate because, when the pattern is changed either a number of control knobs must be actuated, or, if a simplified method of use is desired, this can be achieved only by complicated mechanism.

An object of the invention resides in the simplification of the mode of operation by providing a single button control together with a simple construction of the device. A further object of the invention is to utilise more advantageously the space available for accommodating the device than has been possible hitherto.

This object is achieved by the invention mainly in that several operating components are so constructed and so arranged on a common displaceably mounted carrier or support that, due to a change of position of the carrier, they move in succession into the range of followers or feelers located in front of cam discs and serving as abutments for the operating components which come successively into contact therewith in order to establish the positive drive connection between a corresponding pattern cam disc and a setting means.

A particularly space-saving embodiment of the present invention, is characterised in that the carrier is constructed as a drum mounted concentrically to the pattern cam discs.

Further features of the invention and details of the advantages achieved thereby will be apparent from the following description of one embodiment of an invention by way of example which is illustrated in the drawings and in which:

FIGURE 2 is a section on the line II—II of FIGURE 1, the drum being illustrated partly in section for the sake of clarity.

FIGURE 3 is a section on the line III—III of FIGURE 2;

FIGURE 4 is a development of the circumference of the drum, omitting the pendulums arranged on the drum;

FIGURE 5 is a table setting out the various controls possible with the described and illustrated embodiment; and FIGURE 6 illustrates details of a coupling selector switch forming a part of the mechanism.

Figure 1:
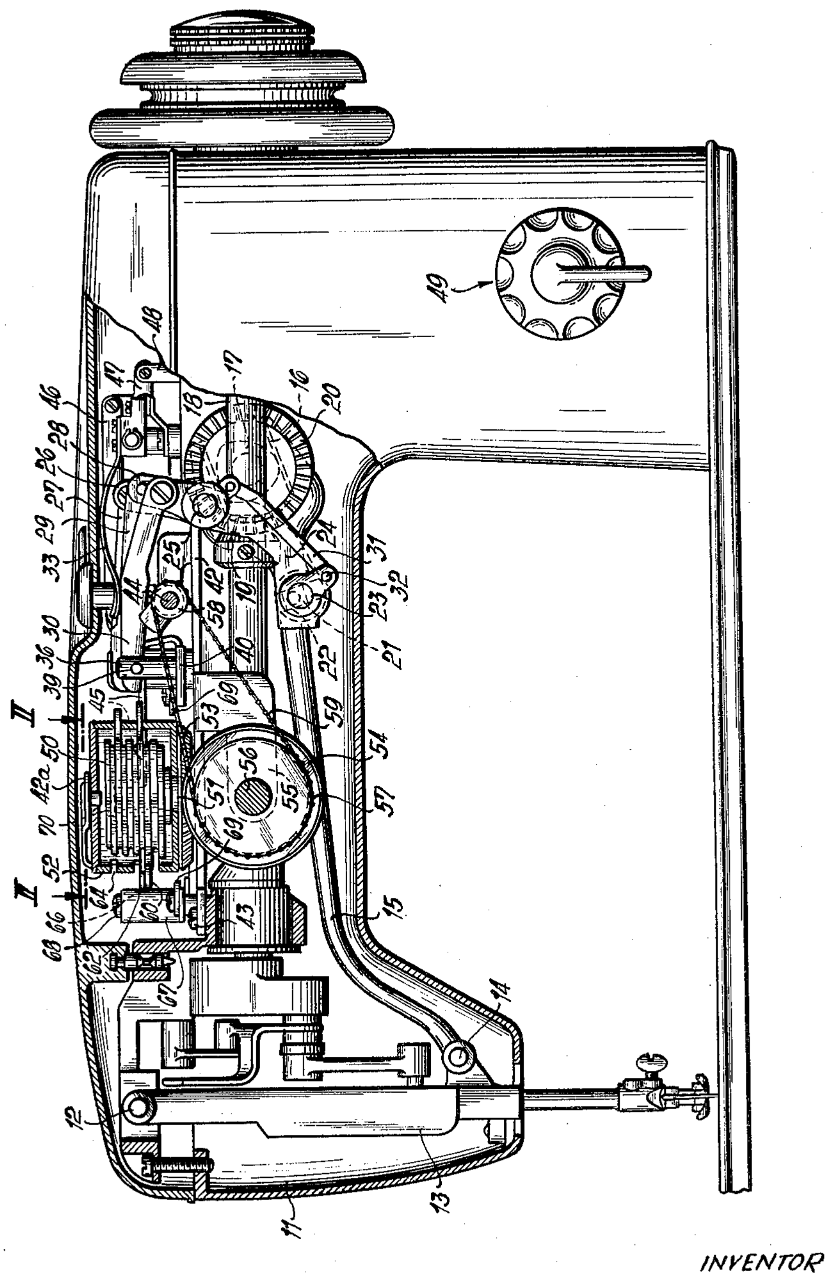
FIGURE 1 is a side elevation and partial section of a sewing machine including the ornamental stitch device.

A needle bar guide 13 is suspended to swing about a pivot pin 12 in the head 11 of the sewing machine illustrated in FIGURE 1. Pivoted by means of a link 14 on the needle bar guide 13 is a bifurcated lever 15, the fork 16 of which encompasses a triangular eccentric 17 which is driven by way of bevel gears 19 and 20 from an arm shaft 18. Oscillating movements in a vertical plane about the link 14 are thereby imparted to the bifurcated lever 15.

As a result of these oscillating movements, a sliding block 21 rotatably mounted on the bifurcated lever 15 is moved up and down and also moves in a slide guide 22 which in turn is formed in one piece with the shaft 23. An inclined position of the slide guide 22 causes the rising and falling movements of the bifurcated lever 15 to be associated with small lateral movements which are transmitted to the needle bar guide 13 resulting in a predetermined over-stitch width. The lateral position of the slide guide 22 determines the starting point of the lateral oscillations of the needle bar guide 13, in other words: the stitch location.

The shaft 23 is pivotably journalled in an arm 24 for laterally displacing the slide guide 22, said arm in turn being pivotable about a fixed spindle 25. At its lower end, the arm 24 has a handle (not shown) extending out of the machine housing, by means of which the arm can be swung about the spindle 25 in order to set the stitch location manually. The over-stitch width can be varied by means of a handle (not shown) secured to the shaft 23 and also externally accessible.

Automatic control of the stitch location and the over-stitch width is achieved by the following arrangement:

The arm 24 extends beyond its pivotal center 25 to define an actuating arm 26 on which is pivoted a draw bar 27 that transmits control impulses from an automatically operating control device, to be described in greater detail hereinafter, to the actuating arm 26 for the stitch location. Pivoted on a bell-crank lever 28 journalled on the spindle 25 are two draw bars 29, 30 which are located at different distances from the pivotal centre 25 and transmit control impulses from the automatic control device to the bell-crank lever 28, and equal axial movements of the draw bars 29, 30 cause different angular deflections of the bell-crank lever 28 owing to the different pivotal arrangement of said draw bars. The angular position of the bell-crank lever 28 is transmitted through a link 31 to an actuating arm 32 which, because of its connection to the shaft 23, determines the over-stitch width of the machine.

The draw bars 27, 29, 30 are downwardly pressed by springs 33 acting individually thereon, in the direction of three coupling studs or pins 34, 35, 36, each of which is slotted at the top to receive a transverse pin 37, 38 and 39 respectively in order to engage thereby with incisions, (See FIG. 6) of the draw bars 27, 29 and 30 when the latter are depressed. In this position, the draw bars 27, 29 or 30 have a form-locking engagement with the appropriate associated coupling studs 34, 35 or 36 in the direction of movement corresponding to their axial direction. The studs are supported by a common rocking lever 40 which is mounted to swing about a collar screw 41 (FIGURE 2). The latter in turn is secured to a supporting plate 42 which carries the automatic control device and is secured in the machine housing by means of screws 43 (in FIGURE 1 one screw is shown).

In order selectively to leave individual bars of the draw bars 27, 29, 30 in their depressed coupling position, but to disengage others by raising them from the transverse pins 37, 38 or 39, a coupling selector switch is provided which comprises a shaft 44 mounted on the supporting plate 42 and provided with various lifting cams for individual draw bars 27, 29, 30. The individual lifting cams are so distributed over the shaft 44 that successive draw bars are coupled with the rocker lever 40 in six angular positions of the shaft 44 succeeding each other at regular intervals of angular displacement.

In the first position, all the draw bars 27, 29, 30 are raised, so that none of them is coupled with the rocker lever 40. In this position there is no automatic control of the needle bar deflection.

In the second angular position of the shaft 44 the draw bars 27 and 30 are raised but the draw bar 29 is lowered.

Thus, swinging movements of the lever 40 result in the control of the over-stitch width, but, only with half the amplitude, on account of the large radius at which the draw bar 29 is pivoted on the bell crank lever 28. This position is indicated hereinafter briefly by ½B.

In a third control position, the draw bar 30 is raised, but the draw bars 27 and 29 are lowered, the oscillations of the lever 40 resulting both in a change of the stitch positions and in a change of the over-stitch width of half the amplitude. This position is shown hereinafter briefly by L½B.

A fourth control position of the shaft 44 allows the draw bars 29 and 30 to be raised, but the draw bar 27 to be lowered, whereby only the stitch location is controlled by the rocker lever 40. This control position is briefly indicated by L.

In a fifth angular position of the shaft 44, the lifting cams arranged thereon result in a raised position of the draw bars 27 and 29, whereas the draw bar 30 is lowered. Consequently a control position giving the full over-stitch width is obtained by the rocker lever 40, which is indicated briefly hereinafter by B.

A sixth and final control position leaves the draw bar 29 in the raised condition, but the draw bars 27 and 30 are lowered, so that the stitch location and the full over-stitch width can be controlled together by the control lever 40, which control position is briefly indicated by LB hereinafter.

Journalled to rotate around the collar screw 41 independently of the rocker lever 40 is a take-up or follower lever 45 which is connected by way of a link 46 with a bell-crank lever 47 (FIGURE 1) which in turn is connected by way of a transmission rod 48 with the setting means or adjusting device 49 for changing the feed of the material. In this manner rocking movements of the take-up or follower lever 45 result in changes in the direction and/or magnitude of the material feed.

For controlling the rocker lever 40 influencing the deflection of the needle bar and of the lever 45 influencing the feed of the material, an assembly of ten super-imposed pattern cam discs 50 is provided which are indicated individually from top to bottom by I, II, 1, 2, 3, 4, 5, 6, 7 and 8. The assembly 50 of pattern cam discs is mounted on a vertical shaft 51 (FIGURE 1) which is driven intermittently in known manner by the arm shaft 18.

Concentrically to the assembly 50 of pattern cam discs but independently thereof is rotatably mounted a support or drum 52 which is carried by a bevel gear 53 journalled to rotate in the bearing plate 42 and is rotatably retained at its upper end by a stirrup 42*a* which is secured to the bearing plate 42. The bevel gear 53 is in engagement with another bevel gear 54. The latter jointly with a grooved wheel 57 is carried by a shaft 56, mounted in an arm 55 formed by bending the bearing plate 42. The wheel 57 is connected to another grooved wheel 58 (FIGURE 1) on the coupling selecting shaft 44 by a flexible endless cord or chain 59. A handle (not shown) projecting out of the housing of the machine is in engagement with the shaft 44. By actuating the handle, the coupling selector shaft 44 and the shaft 56 are turned simultaneously, which is equivalent to a positive adjustment of the drum 52 and the coupling selector shaft 44.

As shown more particularly in FIGURE 4, the support or drum 52 is provided with bearing blocks 60. The latter receive pins 61 (FIGURE 2) about which intermediate members such as pendulums 62 are mounted to swing. These pendulums have abutment projections 63 near their pivotal centre which strike against the outside of the drum 52 so that they can rotate only to a limited extent relatively to the drum 52. The latter has axial slots 64 (FIGURES 2 and 4) which extend in each case over the length of a pendulum 62. The free ends 65 of the intermediate members or pendulums 62 extend through the said slots and can come into abutment with one of the cams of the assembly 50.

In the axial direction of the assembly 50 of cam discs a take-up key or follower 66 (FIGURES 2 and 3) extends over the cam discs 1–8. The element 66 forms a part of a rocker lever 67 which is journalled to swing about a collar screw 68 and is connected by a link 69 to the rocker lever 40. Another take-up key or follower 70 extends, in the axial direction of the cam disc assembly 50 over the cam discs I and II and forms a part of the take-up lever 45 for controlling the material feed. Both followers 66 and 70 are pressed by springs (not shown) towards the pattern cam disc assembly 50, and, as illustrated in FIGURE 2 are bevelled in the peripheral direction of the drum 52 in such manner that, when the drum 52 is turned the pendulums 62 journalled thereon, slide between the cam discs 50 and the followers 66 or 70.

In this manner it is possible, by turning the drum 52, to insert any one of the pendulums 62 between the cam disc associated therewith and the follower 66 or 70. The pendulum 62 which is then located by its free end 65 between a cam disc and a follower 66 or 70 represents an engaged operating component in that it always establishes the positive driving connection between a pattern cam disc and an adjusting device (for varying the needle bar deflection or for varying the feed), as it swings about the pivot pin 61.

The arrangement of the pendulums 62 on the drum 52 is shown in detail in FIGURE 4 in which the bearings 60 of the pendulums 62 and the slots 64 in the drum are shown. Moreover, in order to clearly show the association of the individual slots 64 with the cam discs, the relative level of the cam discs I, II and 1 to 8 in respect of the drum 52 is shown in FIGURE 4 on the right edge of the drum development.

FIGURE 4 also indicates by shaded areas the position of the followers 66 and 70 relative to the drum 52 in a pre-determined angular position thereof; in any other angular position of the drum 52, the followers 66 and 70 would have to be correspondingly displaced horizontally while maintaining their position with respect to each other.

In a position of the drum 52 corresponding to FIGURE 4, the free end 65 of a pendulum 62 associated with the cam disc II (the free end 65 of a pendulum 62 always comes into contact with the left end of a slot 64) acts on the follower 70, and the free end of a pendulum associated with the cam disc 8 acts on the follower 66. The force locking connection of the drum 52 with the coupling selector switch 44 previously described causes in the position shown in FIGURE 4, the control position L½B of the coupling selector switch 44.

The corresponding overall control position is shown by an arrow in the table according to FIGURE 5. In this the first vertical column is indicated in the table by A and characterises the 18 control positions. In column B the type of needle bar control is indicated. Column C identifies the cam curve for the needle bar control. Finally column D identifies the cam curve for the feed control.

By turning the selector switch 44, the adjustments of the selector switch 44 and the drum 52 are positively and synchronously varied. For one rotation of the drum 52, the selector switch 44 performs three rotations, so that the control positions of the latter are established three times with one rotation of the drum 52. In this manner the total control positions possible are shown together in FIGURE 5, that is to say a total of 18 control positions are shown to be possible, of which three, namely Nos. 1, 7 and 13 are equivalent to the "off" condition of the automatic control. In the other 15 control positions each of the needle bar control cams 1–8, if necessary, one of the feed control cams I and II, as also at least one of the couplings 34/27, 35/29 and 36/30 is operative. Secured to the shaft 56 is an indicating disc 71 (FIGURE 3) which on its periphery carries images of the seam formations corresponding to the individual control positions and is visible through an opening in the housing.

Merely by adjusting a single knob, namely the knob connected to the shaft 44, it is therefore possible to select simultaneously both the cams for needle bar control and those for feed control as also the type of needle bar control (over-stitch width, stich location and so forth). The simplicity of the simultaneous selection of the needle bar and the feed control cam by means of the drum 52 is most advantageous, especially as the space requirement for this device is extremely small due to the arrangement enclosing the cam discs 50.

In the foregoing, the invention has been described with reference to a specific illustrative device. It will be evident, however, that variations and modifications, as well as the substitution of equivalent elements for those illustrated, may be made without departing from the scope and broader spirit of the invention as set forth in the appended claims. The specification and drawings are accordingly to be regarded in an illustrative rather than in a limiting sense.

I claim:

1. In a sewing machine provided with ornamental stitch forming mechanism including at least one setting means for adjusting the stitch formation, a plurality of pattern cam disks mounted on a common shaft operative to vary the adjusted position of said setting means and follower means operatively linked to said at least one setting means and disposed in operative relationship to and circumferentially of said cam disks; control means comprising a movable support concentric with and extending around said cam disks and a plurality of intermediate members carried by said support each mounted in a different position on said support and each associated with a particular cam disk, said intermediate members being movable with said support relative to said cam disks and to said follower means into operative positions intermediate a cam disk and the associated follower means thereby establishing in succession different force transmitting connections between said cam disks and said follower means.

2. In a sewing machine provided with ornamental stitch forming mechanism including at least one setting means for adjusting the stitch formation, a plurality of pattern cam disks mounted on a common shaft operative to vary the adjusted position of said setting means and follower means operatively linked to said at least one setting means and disposed in operative relationship to and circumferentially of said cam disks; control means comprising a movable support and a plurality of intermediate members carried by said support each mounted in a different position on said support and each associated with a particular cam disk, said intermediate members being movable with said support relative to said cam disks and to said follower means into operative positions intermediate a cam disk and the associated follower means thereby establishing in succession different force transmitting connections between said cam disks and said follower means, said movable support being in the form of a drum mounted concentrically with and around said cam disks and having slots extending longitudinally of the periphery of the drum for receiving said intermediate members.

3. In a sewing machine provided with ornamental stitch forming mechanism including at least one setting means for adjusting the stitch formation, a plurality of pattern cam disks mounted on a common shaft operative to vary the adjusted position of said setting means and follower means operatively linked to said at least one setting means and disposed in operative relationship to and circumferentially of said cam disks; control means comprising a movable support and a plurality of intermediate members carried by said support each mounted in a different position on said support and each associated with a particular cam disk, said intermediate members being movable with said support relative to said cam disks and to said follower means into operative positions intermediate a cam disk and the associated follower means thereby establishing in succession different force transmitting connections between said cam disks and said follower means, said movable support being in the form of a drum mounted concentrically with and around said cam disks and having slots extending longitudinally of the periphery of the drum for receiving said intermediate members, and said intermediate members being in the form of pendulum members pivotally mounted circumferentially of said drum and adjacent said slots with their longitudinal extent disposed generally tangentially of the periphery of said drum, a base plate supporting said drum, said follower means comprising cam followers pivotally mounted on said plate and said intermediate members having bevelled portions movable in response to rotation of said drum into said slots to said positions intermediate said followers and said cam disks.

4. In a sewing machine comprising control means in accordance with claim 3, the further feature of one said cam follower having a movable end pivotally connected to a rocker lever mounted on said base, coupling elements being disposed on said rocker lever, said setting means including stitch location adjusting means having a double armed lever presenting a first actuating arm, over-stitch adjusting means having a bell crank lever presenting a second actuating arm, draw bars extending between said rocker lever and said actuating arms, said draw bars having conformations at one end thereof movable into engagement with said coupling elements, one said draw bar being connected at the other end thereof to the actuating arm of said double armed lever and two of said draw bars being connected at the other ends thereof to different points along the actuating arm of said bell crank lever, and a coupling selector switch including a selector shaft extending transversely of said draw bars, said shaft having a plurality of cam conformations disposed at different locations radially and longitudinally thereof and operative in response to rotation of said shaft to raise different ones of said draw bars.

5. In a sewing machine in accordance with claim 4, a first bevel gear rotatable on said base plate and supporting said drum, a supporting arm formed by a bent off portion of said base plate, a rotatable shaft mounted on said supporting arm, a second bevel gear rotatable with said shaft disposed at right angles to and meshing with said first bevel gear, a first grooved wheel on said rotatable shaft, a second grooved wheel on said selector shaft and a chain or the like extending intermediate said grooved wheels providing for simultaneous rotation of said movable support and said selector shaft.

References Cited in the file of this patent

UNITED STATES PATENTS

| | | |
|---|---|---|
| 1,832,665 | Spaine | Nov. 17, 1931 |
| 2,025,463 | Lombardi | Dec. 24, 1935 |
| 2,832,302 | Gegauf | Apr. 29, 1958 |
| 2,854,935 | Benink et al. | Oct. 7, 1958 |
| 2,862,468 | Johnson | Dec. 2, 1958 |
| 2,874,773 | Lorenz | Feb. 24, 1959 |
| 2,900,937 | Gegauf | Aug. 25, 1959 |

FOREIGN PATENTS

| | | |
|---|---|---|
| 1,139,759 | France | Feb. 18, 1957 |
| 517,363 | Italy | Feb. 28, 1955 |